United States Patent [19]
Sygen et al.

[11] Patent Number: 5,161,354
[45] Date of Patent: Nov. 10, 1992

[54] AQUATIC PLANT HARVESTER

[75] Inventors: Victor V. Sygen, Eagan, Minn.; David M. Anderson, River Falls, Wis.; Lawrence J. DeVore, Minneapolis, Minn.

[73] Assignee: The Lemna Corporation, Mendota Heights, Minn.

[21] Appl. No.: 698,309

[22] Filed: May 10, 1991

[51] Int. Cl.⁵ .............................................. A01D 44/00
[52] U.S. Cl. ...................................... 56/8; 56/DIG. 2
[58] Field of Search ............................ 56/8, 9, DIG. 2; 210/242.3, 923

[56] References Cited

U.S. PATENT DOCUMENTS

| | | | |
|---|---|---|---|
| 2,065,733 | 1/1934 | Pearson | 56/8 |
| 3,613,891 | 10/1971 | Cloutier | 210/242 |
| 3,708,070 | 1/1973 | Bell | 210/242 |
| 3,966,613 | 6/1976 | Kirk et al. | 210/242 |
| 4,151,081 | 4/1979 | Bolli et al. | 210/83 |
| 4,248,033 | 2/1981 | Bryant | 56/8 |
| 4,265,757 | 5/1981 | Ivanoff | 210/242.3 |
| 4,536,988 | 8/1985 | Hogen | 47/1.5 |
| 4,734,193 | 3/1988 | Cvitas et al. | 210/242.3 |
| 4,795,567 | 1/1989 | Simpson et al. | 210/744 |
| 5,031,390 | 7/1991 | Bryant | 56/8 |

Primary Examiner—Terry Lee Melius
Attorney, Agent, or Firm—Kinney & Lange

[57] ABSTRACT

A harvester for harvesting aquatic plants includes a rotatable gate. The rotatable gate subdivides a containment area which is used to hold harvested aquatic plants. The rotatable gate acts to compress harvested aquatic plants and increases harvest capacity.

23 Claims, 7 Drawing Sheets

AQUATIC PLANT HARVESTER

BACKGROUND OF THE INVENTION

The present invention relates to an aquatic plant harvester.

There has been an increasing interest in the use of aquatic plants as a food source or cash crop. Additionally, aquatic plants have found use in waste water treatment.

Aquatic plants, such as duck-weed, grow near the surface of bodies of water. Aquatic plants tend to have a rather large volume relative to their weight, i.e. a relatively low density. The growing and harvesting of aquatic plants in a waste water treatment system is described in U.S. Pat. No. 4,536,988, which is herein incorporated by reference.

Growing and harvesting aquatic plants has become an increasingly important industry. The plants provide a cash-crop while simultaneously improving the environment. Improving efficiency of growth and harvest techniques is an important factor in continued expansion in the industry of aquatic plant production. U.S. Pat. No. 4,536,988 describes a system of growing aquatic plants which increases yield and the effectiveness of those plants for waste water treatment. Continued improvement of harvesting techniques is important to continued industry growth.

Typically, prior art aquatic plant harvesters comprised a pontoon boat with an aft "gate." Floating aquatic plants were trapped between two pontoons of the boat while forward motion of the boat caused the plants to collect against the aft gate. In operation, harvested aquatic plants were most closely packed and at a highest density close to the aft gate and a lowest density near the bow end of the pontoon boat. This caused the harvested aquatic plants to have an overall wedge shape. This type of prior art aquatic plant harvester did not make efficient use of the harvest containment area.

There is a continuing need for efficient harvesting of aquatic plants.

SUMMARY OF THE INVENTION

The present invention provides an efficient aquatic plant harvester. The present invention comprises a boat which includes port and starboard barriers which extend into the water. In a preferred embodiment, the barriers are pontoons. A gate at the aft end of the boat defines a three sided containment area with the starboard and port barriers. The present invention includes at least one additional gate which extends between the starboard and port pontoons and subdivides the containment area. In one embodiment, the additional gate is rotatably mounted between the port and the starboard barriers with an axis of rotation in a horizontal plane. In another embodiment, the gate has an axis of rotation in a vertical plane. The present invention provides means for compressing harvested aquatic plants in the containment area. In a preferred embodiment, the means for compressing comprises the rotatable gate.

In operation, the aquatic plant harvester of the present invention moves in a forward direction and harvests aquatic plants in the containment area. Aquatic plants are skimmed from the surface of the water. In a case of a rotatable gate with a horizontal axis of rotation, when the containment area is full, the rotatable gate rotates into a vertical position and additional aquatic plants are harvested. In the vertical position, the rotatable gate subdivides the containment area into a bow containment area and an aft containment area. As the bow containment area begins to fill with aquatic plants, the rotatable gate is rotated 180°. This motion pushes the aquatic plants into the aft containment area and compresses them. This process may be repeated until the aft containment area is full of compressed aquatic plants. In a case of a rotatable gate with a vertical axis of rotation, the harvest process is similar, but the gate rotates between a position which is aligned with the direction of the harvester and a position which is perpendicular to the direction of the harvester. Additional rotatable gates may be used to obtain even larger harvest capacity.

DETAILED DESCRIPTION OF THE PREFERRED EMBODIMENTS

Figure 1:
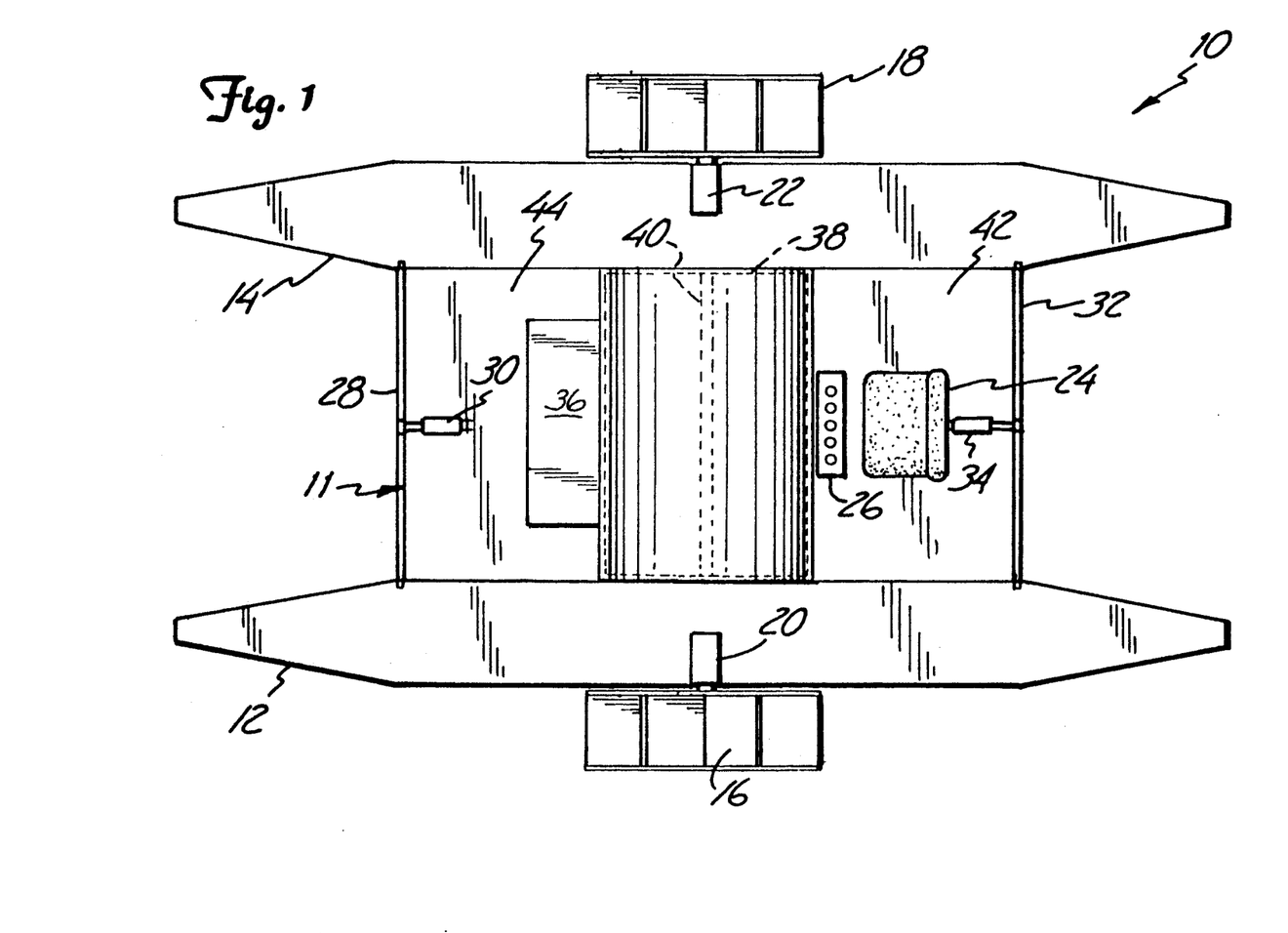
FIG. 1 is a top plan view of an aquatic plant harvester in accordance with the present invention.

FIG. 1 is a top plan view of an aquatic plant harvester 10 in accordance with the present invention. Aquatic plant harvester 10 includes frame 11 which carries port pontoon 12 and starboard pontoon 14. Port paddle wheel 16 is mounted adjacent port pontoon 12 and starboard paddle wheel 18 is mounted adjacent starboard pontoon 14. Port paddle wheel motor 20 and starboard paddle wheel motor 22 are coupled to port paddle wheel 16 and starboard paddle wheel 18, respectively. Operator seat 24 is positioned behind operator console 26.

Retractable bow gate 28 extends between port pontoon 12 and starboard pontoon 14 at a bow end of aquatic plant harvester 10. Bow gate retractor 30 is coupled to retractable bow gate 28. Retractable aft gate 32 extends between port pontoon 12 and starboard pontoon 14 at an aft end of aquatic plant harvester 10. Aft gate retractor 34 is coupled to retractable aft gate 32. Power source 36 is included in aquatic plant harvester 10 and provides power for operation of aquatic plant harvester 10

Aquatic plant harvester 10 shown in FIG. 1 includes rotatable gate 38 in accordance with the present invention. In FIG. 1, rotatable gate 38 is shown in phantom in a horizontal position. Rotatable gate 38 rotates on axle 40. Rotatable gate 38 divides an area between port pontoon 12 and starboard pontoon 14 into aft containment area 42 and bow containment area 44. Pontoons 12 and 14 form side barriers which extend downward, into the water.

Figure 2:
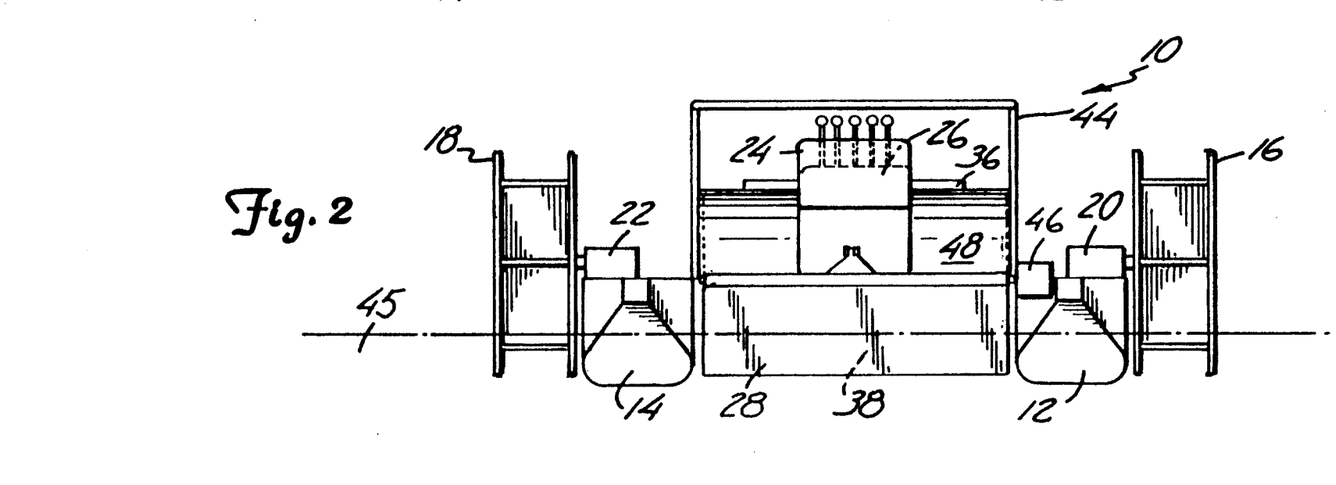
FIG. 2 is a front view of the aquatic plant harvester of FIG. 1.

FIG. 2 shows a front view of aquatic plant harvester 10. FIG. 2 shows port pontoon 12 and starboard pontoon 14, port paddle wheel 16 and starboard paddle wheel 18 and console 26. FIG. 2 also shows a railing 44 which extends around the perimeter of aquatic plant harvester 10. In FIG. 2, aquatic plant harvester 10 is shown floating on water 45.

Rotatable gate 38 is shown in phantom in a vertical position in FIG. 2. Rotatable gate 38 is connected to actuator 46 through axle 40. Actuator 46 is coupled to axle 40 in a manner to provide a rotational force on axle 40 in order to rotate rotatable gate 38.

Figure 3:
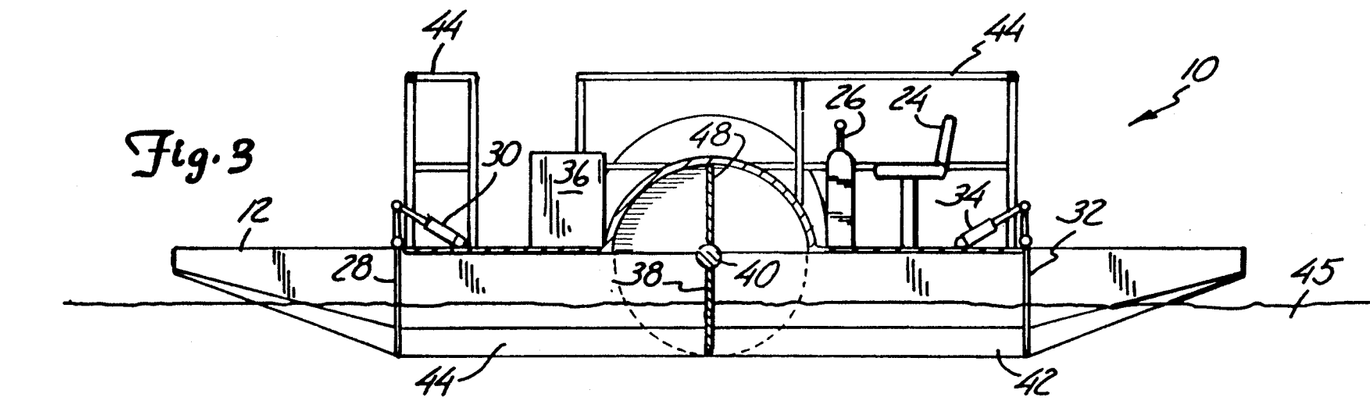
FIG. 3 is a side view of the aquatic plant harvester of FIG. 1.

FIG. 3 is a side view of aquatic plant harvester 10 in accordance with the present invention FIG. 3 shows retractable bow gate 28 and retractable aft gate 32 in phantom. FIG. 3 also shows a guard 48 which covers rotatable gate 38.

In operation, aquatic plant harvester 10 moves in a forward direction to harvest aquatic plants such as, for example, various species of the duck-weed family (Lemna minor). The present invention compresses the harvested aquatic plants and thereby increases storage capacity of aquatic plant harvester 10.

Aquatic plant harvester 10 is designed to travel over a floating aquatic plant barrier matrix (as described in U.S. Pat. No. 4,536,988), and collect aquatic plants trapped between barriers. The present invention divides the containment area of aquatic plant harvester 10 into more than one containment area, for example, aft containment area 42 and bow containment area 44. This is achieved using rotatable gate 38.

As aquatic plant harvester 10 is moved in a forward direction, retractable bow gate 28 is lifted by bow gate retractor 30 so that it does not contact water 45 or the floating aquatic plants. Rotatable gate 38 is rotated into a substantially horizontal position so that it too is not in contact with water 45. Retractable aft gate 32 is placed in a substantially vertical position using aft gate retractor 34. As aquatic plant harvester 10 moves forward, aquatic plants are collected in the containment area defined by port pontoon 12, starboard pontoon 14 and aft gate 32. After aft containment area 42 is full, rotatable gate 38 is rotated to a vertical position so that aft containment area 42 is sealed. This closes aft containment area 42 and initiates collection of aquatic plants in bow containment area 44. As bow containment area 44 begins to fill with aquatic plants, rotatable gate 38 is rotated 180° in a direction which pushes the aquatic plants from bow collection area 44 to aft collection area 42. The 180° rotation leaves rotatable gate 38 again in a substantially vertical position. This allows filling of bow containment area 44 to continue. When bow containment area 44 is again full, the step of emptying bow containment area 44 and compressing aquatic plants in aft containment area 42 is repeated by rotating rotatable gate 38 through another 180° revolution. Guard 48 covers rotatable gate 38 and prevents gate 38 from throwing harvested aquatic plants from the containment area.

Figure 4:
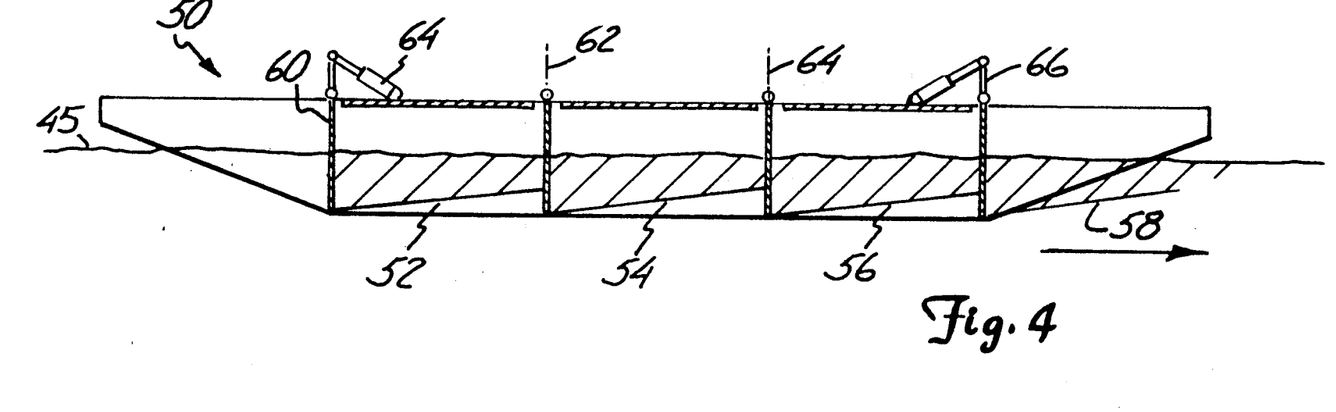
FIG. 4 shows an embodiment of the present invention with a plurality of rotatable gates.

FIG. 4 is a side view of aquatic plant harvester 50 which includes a plurality of containment areas. Aquatic plant harvester 50 includes a first containment area 52 which is closest the aft of aquatic plant harvester 50. Aquatic plant harvester 50 also includes containment areas 54, 56, and 58. Containment area 58 is closest to the bow of aquatic plant harvester 50. Containment area 52 is defined by a retractable aft gate 60 and rotatable gate 62. Retractable aft 60 is coupled to retractor 64. Containment area 54 is defined by rotatable gate 62 and rotatable gate 64. Containment area 56 is defined by rotatable gate 64 and rotatable gate 66. Bow containment area 58 is open at the front end and may be selectively closed at the back end with rotatable gate 66.

FIG. 4 shows an embodiment of the present invention in which a plurality of containment areas 52, 54, 56, and 58, are used in harvesting aquatic plants. In operation of aquatic plant harvester 50, rotatable gates 62, 64, and 66 are rotated into a generally horizontal position so that they are not in contact with water and retractable gate 60 is placed in a substantially vertical position. As aquatic plant harvester 50 proceeds in a forward direction (the direction indicated by the arrow in FIG. 4) aquatic plants are collected in the area defined by containment areas 52, 54, 56, and 58. Due to the forward motion of aquatic plant harvester 50, aquatic plants are pressed against retractable gate 60. This causes the harvested aquatic plants to be most compressed closest near the aft region of aquatic plant harvester 50. Once containment area 50 is full, rotatable gate 62 is pivoted into a vertical position. As aquatic plant harvester 50 continues to move forward, additional aquatic plants are added to containment area 52 by rotating rotatable gate 62 in a direction so that aquatic plants from containment area 54 is pressed into containment area 52. This continues until containment area is completely full and can hold no more aquatic plants. At this point, rotatable gate 64 may be rotated, so that the aquatic plants are compressed into containment area 54. This process continues until all containment areas are at their capacity.

For aquatic plant harvester 50 shown in FIG. 4 or aquatic plant harvester 10 shown in FIGS. 1–3, once all containment areas are full, the harvester may be unloaded at an unloading dock (not shown) by moving the harvester in a backward direction so that the harvested aquatic plants come free from the containment areas. The speed of the unloading process may be increased by spinning the rotatable gates in a direction which urges the aquatic plants from the containment areas. This acts to sweep the harvested aquatic plants from the region between the two pontoons.

In a preferred embodiment, rotatable gates are formed using a solid sheet of 12-gauge steel or equivalent. Bracing may be included to add stiffness. Preferably, a material finish is added which inhibits corrosion. The material finish should be non-abrasive to polyethylene barriers which are used to grow the duck-weed as described in U.S. Pat. No. 4,536,988. The size of the rotatable gate should be about equal to twice the distance between the axis of rotation and the draft of aquatic plant harvester 10. (The draft of aquatic plant harvester 10 is the depth to which pontoons 12 and 14 extend into water 45.)

Gates made in accordance with the present invention are designed to allow interference-free rotation between the pontoons of the harvester, while preventing aquatic plants from escaping between the pontoon/gate interface. The axle of the rotatable gate should be strong enough to prevent flexure of the gate and should be able to support loads applied by the motor and harvested aquatic plants. The system should include detents in both vertical and horizontal positions to aid an operator in positioning the rotatable gate.

The hydraulic motor which is used to rotate the rotatable gate is connected to the axle of the rotatable gate. Sealed bearings are used to ensure a smooth transfer of power along the axis of the rotatable gate. The motor may be geared to allow variable rotation speed of the gate in either direction. In a preferred embodiment, the gate rotation speed varies from about 30 RPM to about 90 RPM.

Figure 5:
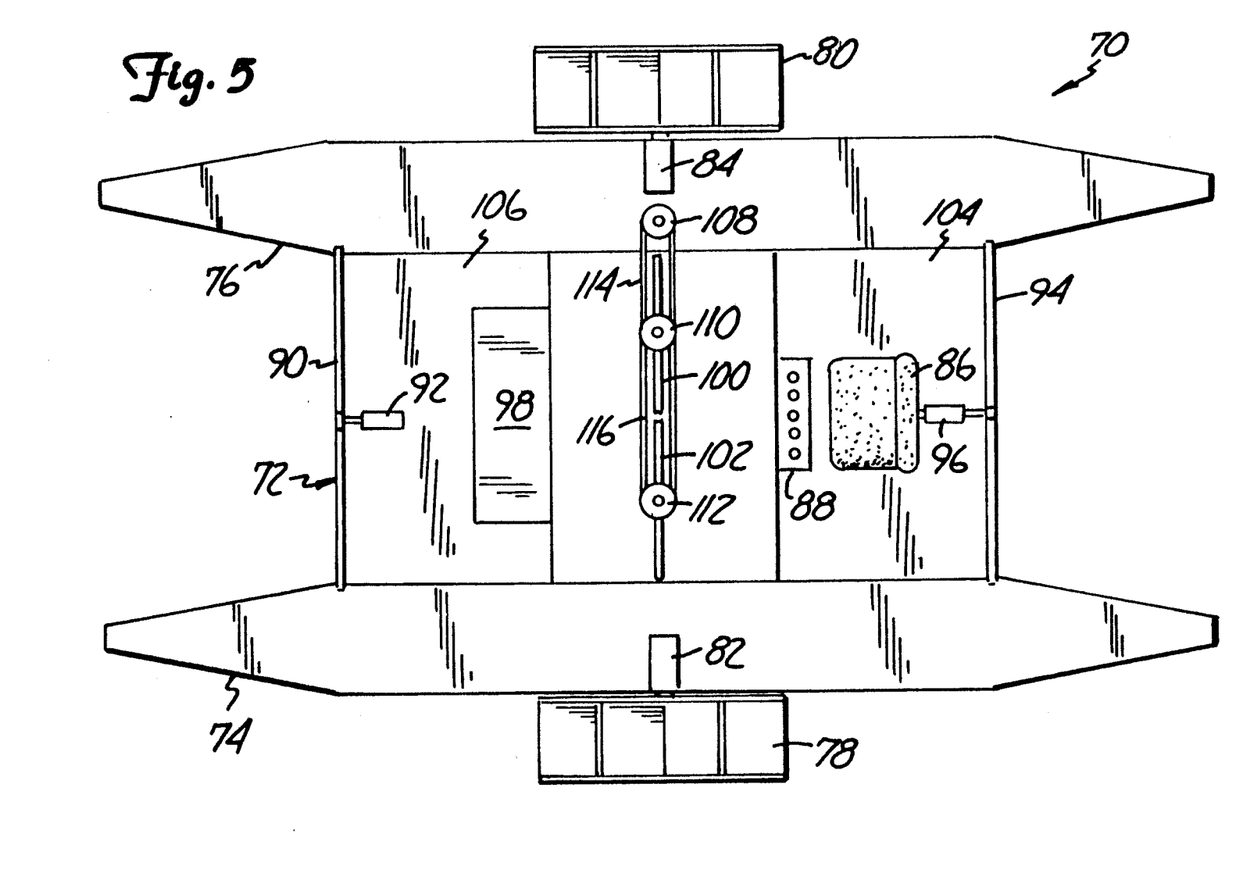
FIG. 5 is a top plan view of an aquatic plant harvester with rotatable gates having vertical axes of rotation, in accordance with the present invention.
Figure 6:
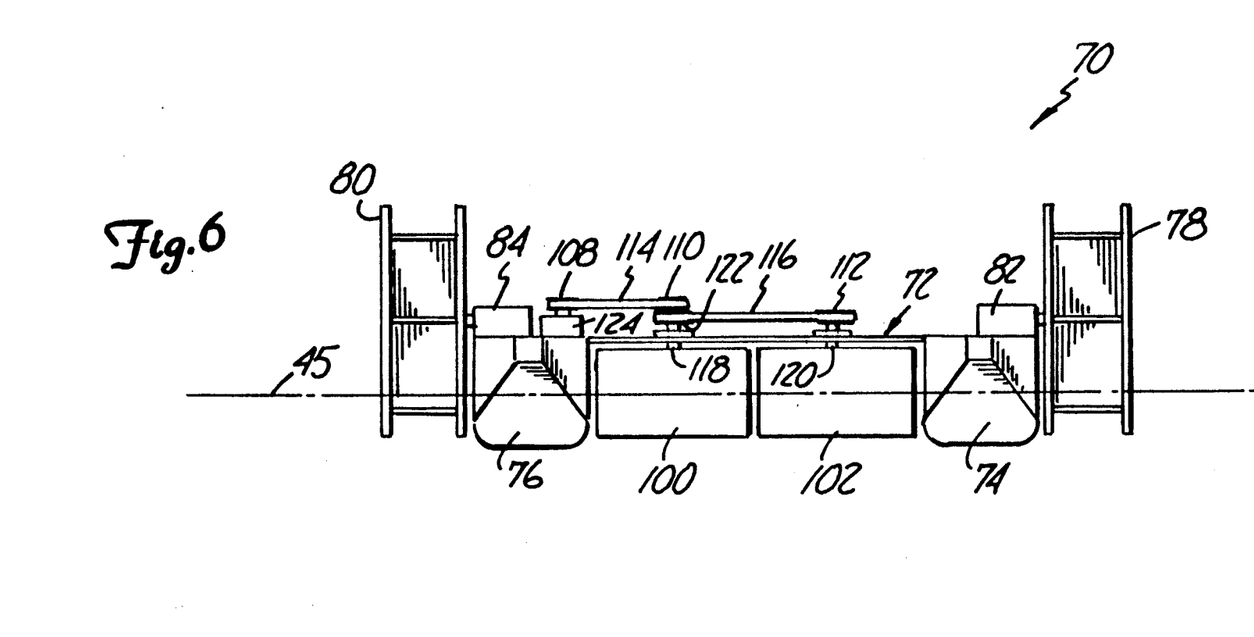
FIG. 6 is a front view of the aquatic plant harvester of FIG. 5.

FIGS. 5 and 6 show another embodiment of the present invention in which the rotatable gates have a vertical axis of rotation. FIG. 5 is a top plan view of an aquatic plant harvester 70 in accordance with the present invention. Aquatic plant harvester 70 includes frame 72 which carries port pontoon 74 and starboard pontoon 76. Port paddle wheel 78 is mounted adjacent port pontoon 74 and starboard paddle wheel 80 is mounted adjacent starboard pontoon 76. Port paddle wheel motor 82 is coupled to port paddle wheel 78 and starboard paddle wheel motor 84 is coupled to starboard paddle wheel 80. Operator seat 86 is positioned behind operator console 88.

Retractable bow gate 90 extends between port pontoon 74 and starboard pontoon 76 at a bow end of aquatic plant harvester 70. Bow gate retractor 92 is coupled to retractable bow gate 90. Retractable aft gate 94 extends between port pontoon 74 and starboard pontoon 76 at an aft end of aquatic plant harvester 70. Aft gate retractor 96 is coupled to retractable aft gate 94. Power source 98 provides power for operation of aquatic plant harvester 70.

Aquatic plant harvester 70 shown in FIG. 5 includes rotatable gates 100 and 102 in accordance with the present invention. Rotatable gates 100 and 102 have axes of rotation in a vertical plane. Rotatable gates 100 and 102 divide an area between port pontoon 74 and starboard pontoon 76 into aft containment area 104 and bow containment area 106. Pontoons 74 and 76 form side barriers which extend downward into the water.

Aquatic plant harvester 10 includes a drive gear 108 coupled to starboard pontoon 76. Drive gear is coupled to rotatable gate gears 110 and 112 by drive chains 114 and 116. Other mechanical means may also be used to couple gates 100 and 102 to a drive motor. Gears 110 and 112 are coupled to rotatable gates 100 and 102, respectively.

FIG. 6 shows a front view of aquatic plant harvester 70 shown in FIG. 5. FIG. 6 shows port pontoon 74 and starboard pontoon 76, port paddle wheel 78 and starboard paddle wheel 80. In FIG. 6, aquatic plant harvester 70 is shown floating water 45.

FIG. 6 shows rotatable gates 100 and 102 coupled to gears 110 and 112 through axles 118 and 120, respectively. Gear 122 is coupled to axle 118 and is connected to gear 112 through chain 116. Aquatic plant harvester 70 includes a hydraulic motor 124 which is coupled to gear 108.

In operation, hydraulic motor 124 powers rotation of gates 100 and 102 through gears 108, 110, 112, and 122 in conjunction with chains 114 and 116. Gates 100 and 102 are rotatably coupled to frame 72 and are free to rotate 360°. During harvesting, aquatic plant harvester 70 moves in a forward direction to harvest aquatic plants. Retractable bow gate 90 is lifted by bow gate retractor 92 so that is does not contact water 45 or the floating aquatic plants. Rotatable gates 100 and 102 are positioned substantially parallel with the direction of travel using hydraulic motor 124. Retractable aft gate 94 is placed in a substantially vertical position using aft gate retractor 96. As aquatic plant harvester 70 moves forward, aquatic plants are collected in the containment area defined by port pontoon 74, starboard pontoon 14, and aft gate 94. After aft containment area 104 is full, rotatable gates 100 and 102 are rotated to a position that is generally perpendicular to the direction of travel. This seals aft containment are 104 and initiates collection of aquatic plants in bow containment area 106. As bow containment area 106 begins to fill with aquatic plants, rotatable gates 100 and 102 are rotated 180° using hydraulic motor 84. This motion pushes aquatic plants from bow collection area 106 to aft collection area 104. Following the 180° rotation of gates 100 and 102, the gates are again positioned generally perpendicular to the direction of travel. This allows filling of bow containment are 106 to continue. Rotation of gates 100 and 102 compresses aquatic plants in aft containment area 104. This process continues until both after containment area 104 and bow containment area 106 are full of harvested aquatic plants.

Rotatable gates 100 and 102 rotate between a non-engaging position which is in substantial alignment with a direction of travel of harvester 10. In the non-engaging position, rotatable gates 100 and 102 do not substantially impede flow of water and aquatic plants between port pontoon 74 and starboard pontoon 76. In an engaging position, rotatable gates 100 and 102 are positioned substantially perpendicular to the direction of travel of aquatic plant harvester 70 and subdivide the space between pontoons 74 and 76 into aft containment area 104 and bow containment area 106. Rotatable gates 100 and 102 should substantially seal aft containment area 104 from bow containment area 106 when positioned substantially perpendicular to the direction of travel of aquatic plant harvester 70. This ensures a tight seal between containment areas 104 and 106.

Although rotatable gates 100 and 102 of aquatic plant harvester 70 are coupled to a single hydraulic motor 124, in other embodiments of the present invention separate hydraulic motor may be employed so that hydraulic gates 100 and 102 may be independently operated. Furthermore, addition sets of parallel gates may be used to arrive at a configuration similar to that shown for aquatic plant harvester 50 shown in FIG. 4. Additionally, single rotatable gates having a vertical axis of rotation may be used or the number of parallel rotatable gates may be extended beyond the two which are shown in FIGS. 5 and 6.

Figure 7:
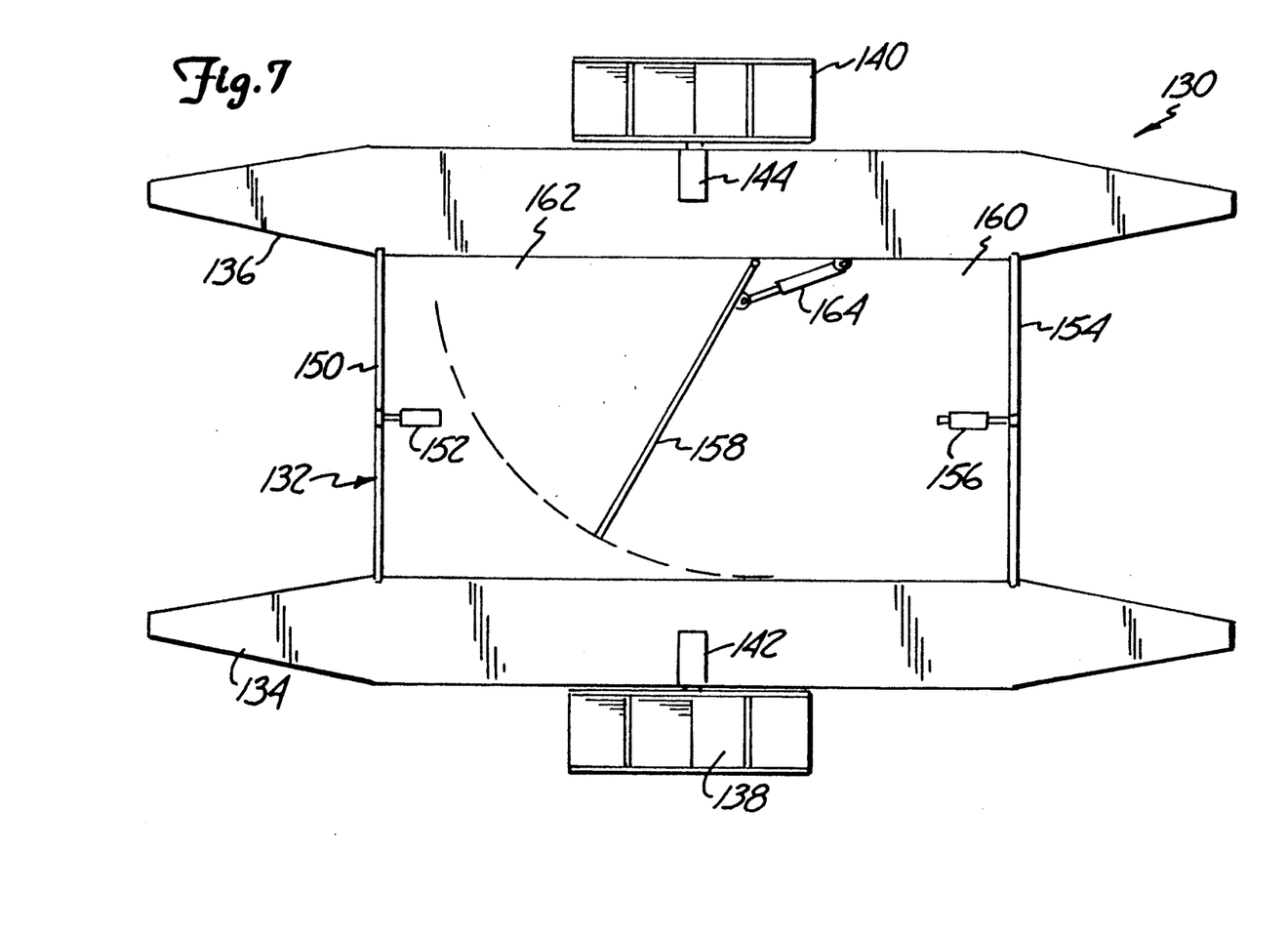
FIG. 7 is top plan view of an aquatic plant harvester using a single swingable gate in accordance with the present invention.

FIG. 7 is a top plan view of an aquatic plant harvester 130 in accordance with the present invention. Aquatic plant harvester 130 includes frame 132 which carries port pontoon 134 and starboard pontoon 136. Port paddle wheel 138 is mounted adjacent port pontoon 134 and starboard paddle wheel 140 is mounted adjacent starboard pontoon 136. Port paddle wheel motor 142 is coupled to port paddle wheel 138 and starboard paddle wheel motor 144 is coupled to starboard paddle wheel 140.

Retractable bow gate 150 extends between port pontoon 134 and starboard pontoon 136 at a bow end of aquatic plant harvester 130. Bow gate retractor 152 is coupled to retractable bow gate 150. Retractable aft gate 154 extends between port pontoon 134 and starboard pontoon 136 at an aft end of aquatic plant harvester 130. Aft gate retractor 156 is coupled to retractable aft gate 154.

Aquatic plant harvester 130 shown in FIG. 7 includes swingable gate 158. Swingable gate 158 swings open and close. In an open position, or non-engaging position, swingable gate 158 lies generally parallel with a side of starboard pontoon 136. In a closed or engaging position, swingable gate 158 extends between starboard pontoon 136 and port pontoon 134 and subdivides a containment area between port pontoon 134 and starboard 136 into an aft containment area 160 and a bow containment area 162. Swingable gate 158 is coupled to a hydraulic actuator 164. Hydraulic actuator 164 is also coupled to starboard pontoon 136.

Operation of aquatic plant harvester 130 is similar to operation of aquatic plant harvesters 10, 50, and 70, described above. Paddles 138 and 140 propel aquatic plant harvester 130 in a forward direction. Swingable gate 158 is swung to the non-engaging position so that floating aquatic plants may be harvested in the containment area between pontoons 134 and 136. As the containment area fills, swingable gate 158 can be swung to the engaging position so that aquatic plants are compressed in aft containment area 160. This process can be repeated until aft containment area 160 reaches a maximum capacity. When aft containment area 160 is at maximum capacity, swingable gate 158 is left in the engaging position and harvest can continue using bow containment area 162 When bow containment area 162 is full, retractable gate 150 can be closed which seals off the containment area between port pontoon 134 and starboard pontoon 136.

Figure 8:
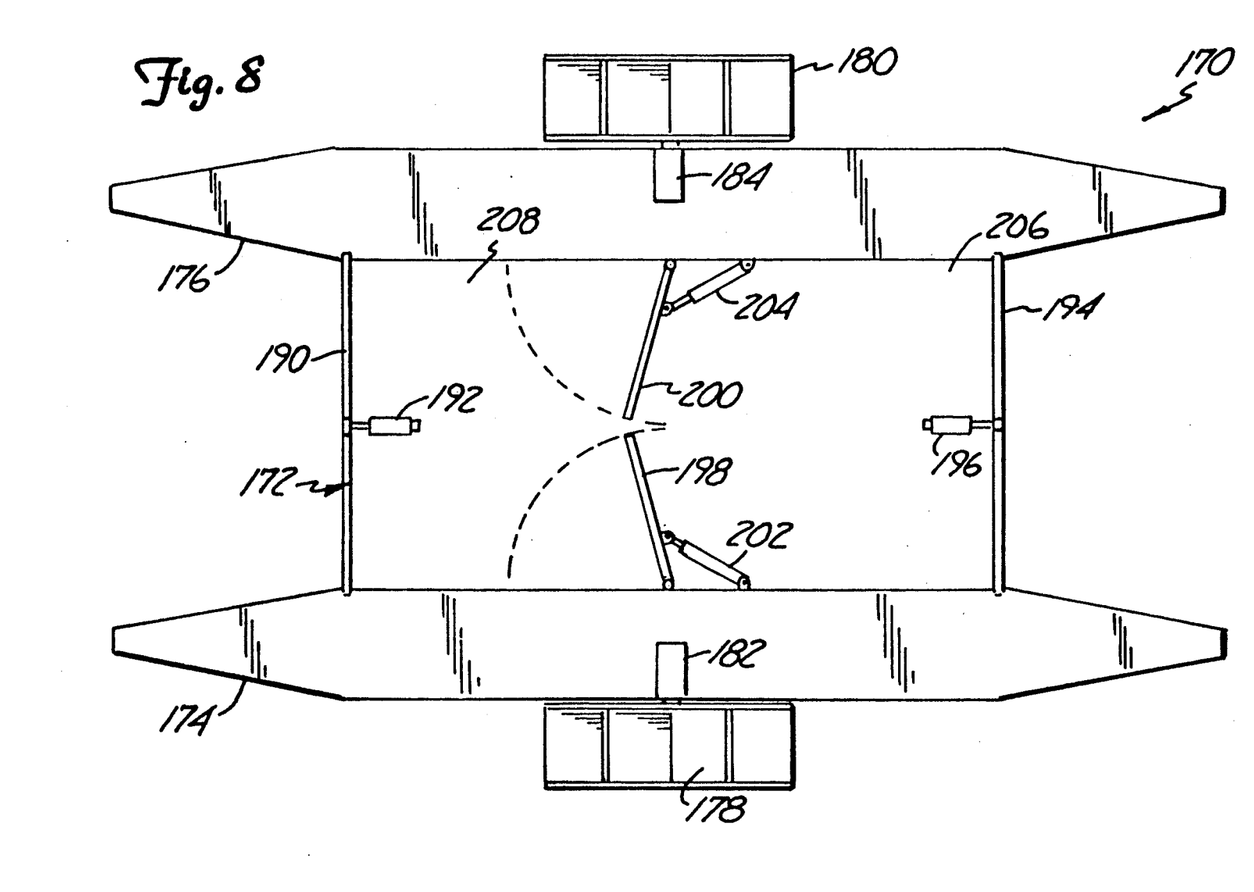
FIG. 8 is a top plan view of an aquatic plant harvester using two swingable gates in accordance with the present invention.

FIG. 8 is a top plan view of an aquatic plant harvester 170 in accordance with the present invention. Aquatic plant harvester 170 includes frame 172 which carries port pontoon 174 and starboard pontoon 176. Port paddle wheel 178 is mounted adjacent port pontoon 174 and starboard paddle wheel 180 is mounted adjacent starboard pontoon 176. Port paddle wheel motor 182 is coupled to port paddle wheel 178. Starboard paddle wheel motor 184 is coupled to starboard paddle wheel 180.

Retractable bow gate 190 extends between port pontoon 174 and starboard pontoon 176 at a bow end of aquatic plant harvester 170. Bow gate retractor 192 is coupled to retractable bow gate 190. Retractable aft gate 194 extends between port pontoon 174 and starboard pontoon 176 at an aft end of aquatic plant harvester 170. Aft gate retractor 196 is coupled to retractable aft gate 194.

Aquatic plant harvester 170 shown in FIG. 8 includes swingable gates 198 and 200. Swingable gate 198 is coupled to port pontoon 174 and hydraulic actuator 202. Hydraulic actuator 202 is coupled to port pontoon 174. Swingable gate 200 is coupled to starboard pontoon 176 and hydraulic actuator 204. Hydraulic actuator 204 is coupled to starboard pontoon 176. Swingable gates 198 and 200 swing between an engaging position in which they are aligned generally perpendicular to the direction of travel of aquatic plant harvester 170 and a non-engaging position in which they are aligned generally parallel with the direction of travel of aquatic plant harvester 170.

In operation, aquatic plant harvester 170 moves in a forward direction under power from paddles 178 and 180. During harvesting, hydraulic actuators 202 and 204 swing swingable gates 198 and 200 into the non-engaging position in which they are aligned generally parallel with the direction of travel of aquatic plant harvester 170. Aquatic plants are harvested in the area between pontoons 174 and 176. When the containment area is substantially full, swingable gates 198 and 200 are swung into an engaging position which subdivides the containment area into an aft containment area 206 and a bow containment area 208. The swinging action of swingable gates 198 and 200 compresses harvested aquatic plants in aft containment area 206. Gates 198 and 200 can be swung open again and the process repeated until aft containment area 206 has reached capacity. When aft containment area 206 has reached capacity, swingable gates 198 and 200 are left in the engaging position and harvesting can continue using bow containment area 208. When bow containment area 208 is at capacity, retractable gate 190 can be shut so that the containment area between port pontoon 174 and starboard pontoon 176 is closed.

In FIGS. 7 and 8, swingable gates 158, 198, and 200 all have a vertical axis of rotation and swing between an engaging position and a non-engaging position.

Although the present invention has been described with reference to preferred embodiments, workers skilled in the art will recognize that changes may be made in form and detail without departing from the spirit and scope of the invention. For example, aquatic plants other than duck-weed may be collected and may include aquatic plants which grow along the bottom of a body of water. If bottom growing plants are being harvested, the harvester of the present invention should include an underwater sickle bar cutter to cut underwater plants which are then moved into the containment area. Furthermore, the present invention includes alternative gate designs and other designs in which the containment area is subdivided.

What is claimed is:

1. A harvester for moving longitudinally in a direction of travel and harvesting aquatic plants, comprising:
   a frame;
   a first barrier coupled to the frame and aligned generally parallel with the direction of travel;
   a second barrier coupled to the frame and aligned generally parallel with the direction of travel and the first barrier;
   a first gate coupled to the frame and extending longitudinally between the first and second barriers and generally perpendicular to the direction of travel, wherein the first and second barriers and the first gate define a containment area for containing harvested aquatic plants; and
   a second gate extending longitudinally between the first and second barriers and generally perpendicular to the direction of travel, the second gate coupled to the frame whereby the second gate is moveable between a non-engaging position and an engaging position in which the second gate is engaged with the containment area to subdivide the containment area.

2. The harvester of claim 1 wherein the second gate is rotatably mounted to the frame and the second rotates in a direction which compresses harvested aquatic plants against the first gate.

3. The harvester of claim 2 wherein the second rotatable gate has a horizontal axis of rotation.

4. The harvester of claim 2 wherein the second rotatable gate has a vertical axis of rotation.

5. The harvester of claim 4 including at least one other gate having a vertical axis of rotation extending longitudinally between the first and second barriers and generally parallel with the second gate.

6. The harvester of claim 1 wherein the first and second barriers comprise pontoons.

7. The harvester of claim 1 including a third gate which further subdivides the containment area.

8. The harvester of claim 1 including a retractable bow gate coupled to the frame and extending longitudinally between the first and second barriers and generally perpendicular to the direction of travel.

9. The harvester of claim 1 wherein the harvester has a draft when floating in water and the second gate has a length which is about twice the distance from an axis of the second gate to the draft of the harvester and a width which is about equal to the distance between the first and second barriers.

10. The harvester of claim 1 wherein the first gate is retractable from an engagement position.

11. An aquatic plant harvester comprising:
a frame;
an elongated first barrier coupled to the frame and aligned generally parallel with a forward direction of travel of the aquatic plant harvester;
an elongated second barrier coupled to the frame and aligned generally parallel with the elongated first barrier and the direction of travel, wherein the elongated first barrier and the elongated second barrier form a containment area for containing harvested aquatic plants; and
a rotatable gate rotatably mounted to the frame, the rotatable gate rotatable between a first position for not engaging floating aquatic plants and a second position for engaging floating aquatic plants.

12. The aquatic plant harvester of claim 11 including an aft gate mounted to the frame and extending between the elongated first and second barriers and perpendicular to the direction of travel, wherein the first and second barriers and the aft gate define the containment area for containing harvested aquatic plants.

13. The aquatic plant harvester of claim 12 wherein the rotatable gate is rotatably mounted to the frame and rotates in a direction which compresses harvested aquatic plants against the aft gate.

14. The aquatic plant harvester of claim 12 including a retractable bow gate.

15. The aquatic plant harvester of claim 11 including a plurality of rotatable gates.

16. The aquatic plant harvester of claim 11 including a paddle wheel coupled to the frame for propelling the harvester.

17. The aquatic plant harvester of claim 11 wherein the harvester has a draft when floating in water and the rotatable gate has a length which is about twice a distance from an axis of the rotatable gate to the draft of the harvester and a width which is about equal to a distance between the first and second barriers 18. The aquatic plant harvester of claim 11 wherein the elongated first and second barriers comprise pontoons.

19. The aquatic plant harvester of claim 11 wherein the rotatable gate has a horizontal axis of rotation.

20. The aquatic plant harvester of claim 11 wherein the rotatable gate has a vertical axis of rotation.

21. The aquatic plant harvester of claim 20 including at least one additional rotatable gate having a vertical axis of rotation.

22. A method of harvesting aquatic plants, comprising:
moving an aquatic plant harvester through the aquatic plants;
collecting aquatic plants in a first collection area of the harvester;
compressing harvested aquatic plants in the first collection area by rotating a rotatable gate; and
collecting aquatic plants in a second collection area of the harvester which is positioned forward of the first collection area.

23. The method of claim 22 including:
collecting aquatic plants in a plurality of collecting areas.

* * * * *